United States Patent
Chen

(10) Patent No.: US 10,021,641 B2
(45) Date of Patent: Jul. 10, 2018

(54) ELECTRONIC DEVICE WITH WIRELESS POWER TRANSFER AND REDUCED POWER CONSUMPTION

(71) Applicant: Marcellus Chen, Fremont, CA (US)

(72) Inventor: Marcellus Chen, Fremont, CA (US)

(*) Notice: Subject to any disclaimer, the term of this patent is extended or adjusted under 35 U.S.C. 154(b) by 0 days.

(21) Appl. No.: 15/473,765

(22) Filed: Mar. 30, 2017

(65) Prior Publication Data

US 2017/0289905 A1 Oct. 5, 2017

Related U.S. Application Data

(60) Provisional application No. 62/317,249, filed on Apr. 1, 2016.

(51) Int. Cl.
| | |
|---|---|
| *H04B 1/10* | (2006.01) |
| *H04W 52/02* | (2009.01) |
| *H04B 1/40* | (2015.01) |
| *H02J 7/02* | (2016.01) |

(52) U.S. Cl.
CPC ......... *H04W 52/0209* (2013.01); *H02J 7/025* (2013.01); *H04B 1/40* (2013.01)

(58) Field of Classification Search
CPC ............... H04W 52/0209; H04W 52/0245; H04B 1/40; H04B 2001/1072; H04B 2001/71365; H04B 17/318; H02J 7/025
See application file for complete search history.

(56) References Cited

U.S. PATENT DOCUMENTS

| | | | | |
|---|---|---|---|---|
| 8,391,817 B2* | 3/2013 | Noel | .................... | H01Q 1/2208 455/193.1 |
| 8,416,721 B1 | 4/2013 | Chen | | |
| 9,369,163 B2 | 6/2016 | Chen | | |
| 9,425,831 B1* | 8/2016 | Lee | ....................... | H04B 1/0053 |
| 2002/0168994 A1* | 11/2002 | Terry | .................. | H04W 52/146 455/522 |
| 2008/0080418 A1* | 4/2008 | Rofougaran | ............ | H04L 12/14 370/329 |
| 2009/0117872 A1* | 5/2009 | Jorgenson | .......... | G06K 19/0713 455/334 |
| 2010/0142509 A1* | 6/2010 | Zhu | ...................... | H04B 1/1607 370/343 |

(Continued)

*Primary Examiner* — Andrew Wendell
(74) *Attorney, Agent, or Firm* — Patterson & Sheridan, LLP

(57) ABSTRACT

An electronic device including wireless energy receiver circuitry and an energy receiver antenna that is connected to the wireless charging circuitry can be used to improve electrical efficiency. The energy receiver antenna has a tunable reception frequency that can be controlled to optimize energy reception. For example, the energy receiver antenna can be tuned to match a wireless transmission frequency being output by the electronic device itself. If the electronic device is not currently outputting any transmission signals, the energy receiver antenna can be tuned to optimize energy reception from any other available signal source. In some examples, the electronic device may dynamically tune the reception frequency of the energy receiver antenna according to the relative strength of signals being received. Energy received by the energy receiver antenna can be supplied to power various components of the electronic device.

11 Claims, 5 Drawing Sheets

(56) References Cited

U.S. PATENT DOCUMENTS

| | | | |
|---|---|---|---|
| 2014/0024402 A1* | 1/2014 | Singh | H04B 17/12 455/501 |
| 2015/0305035 A1* | 10/2015 | Hu | H04W 24/02 370/329 |
| 2017/0149265 A1* | 5/2017 | Huang | H04W 4/008 |
| 2017/0214567 A1* | 7/2017 | Salkintzis | H04L 41/0677 |

* cited by examiner

ELECTRONIC DEVICE WITH WIRELESS POWER TRANSFER AND REDUCED POWER CONSUMPTION

CROSS-REFERENCE TO RELATED APPLICATIONS

This application claims priority to U.S. provisional application having Ser. No. 62/317,249, filed on Apr. 1, 2016, which is hereby incorporated by reference in its entirety.

BACKGROUND

Field

This disclosure relates generally to electronic devices, and more particularly to electronic devices including a radio frequency (RF) antenna.

Description of Related Art

FIG. 1 depicts a top view of a conventional wireless communication device 100. Common wireless communication devices 100 include cellular phones, wireless networking devices, wireless handsets, personal digital assistants (PDAs), laptop and desktop computers, routers, and key fobs. As shown, the wireless communication device 100 includes a battery 102, a digital signal processor (DSP) 104, a transceiver 106, a power amplifier 108, an antenna 110, and other electronic circuitry 112. The battery 102 provides direct current (DC) power to other device components. The digital signal processor (DSP) 104 manipulates communication signals between analog and digital signal processing domains, while the transceiver 106 up and down converts the communication signals between low frequencies and RF frequencies. The power amplifier 112 amplifies a power of the signal output from the transceiver to drive a transmission signal into the antenna 110. In turn, the antenna 110 transmits the transmission signal into free space. A receiver of another wireless communication device (not shown) may receive the radiated signal through a receiver antenna and process the received signal, thus allowing wireless communication of information between the wireless communication device 100 and the other wireless communication device.

Certain electronic devices have been developed to incorporate a wireless charging or powering function in which an RF signal is received by an antenna of the electronic device and the energy provided by the RF signal is used, for example, to charge battery 102 or operate electrical circuitry 112. Some such devices have been previously disclosed in U.S. Pat. No. 8,416,721 and U.S. Pat. No. 9,369,163, the entire contents of which are incorporated herein by reference.

SUMMARY OF DISCLOSURE

In one embodiment, an electronic device includes wireless energy receiver circuitry and an energy receiver antenna connected to the wireless charging circuitry. The energy receiver antenna has a tunable reception frequency. A controller in the electronic device is configured to tune the tunable reception frequency of the energy receiver antenna. For example, the controller may tune the tunable reception frequency to optimize the collection by the energy receiver antenna of available signals to improve energy efficiency of the electronic device. In some examples, the electronic device may also include a transmitter generating a wireless transmission signal at an RF transmit frequency and an RF transmitter antenna for transmitting the wireless transmission signal at the RF transmit frequency. In some examples, the controller can be configured to tune the tunable reception frequency of the energy receiver antenna to the RF transmit frequency if the RF transmitter antenna is actively transmitting the wireless transmission signal.

BRIEF DESCRIPTION OF THE DRAWINGS

So that the manner in which the above recited features of the present disclosure can be understood in detail, a more particular description, briefly summarized above, may be had by reference to example embodiments, some of which are illustrated in the appended drawings. It is to be noted, however, that the appended drawings illustrate only some possible embodiments and are therefore not to be considered limiting of disclosure scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Advantageously, electronic devices disclosed herein include at least one energy receiver antenna that can receive signals (energy) output from one or more sources, including from the electronic devices' own transmission signals. The received signals can then be converted to direct current (DC) power that can be provided to various components of the electronic devices. Doing so can effectively reduce internal power consumption by the electronic device to extend battery lifetime by providing supplemental battery charging power or power that can be used to power components of the electronic device.

Tunable ERX Antenna

Figure 1:
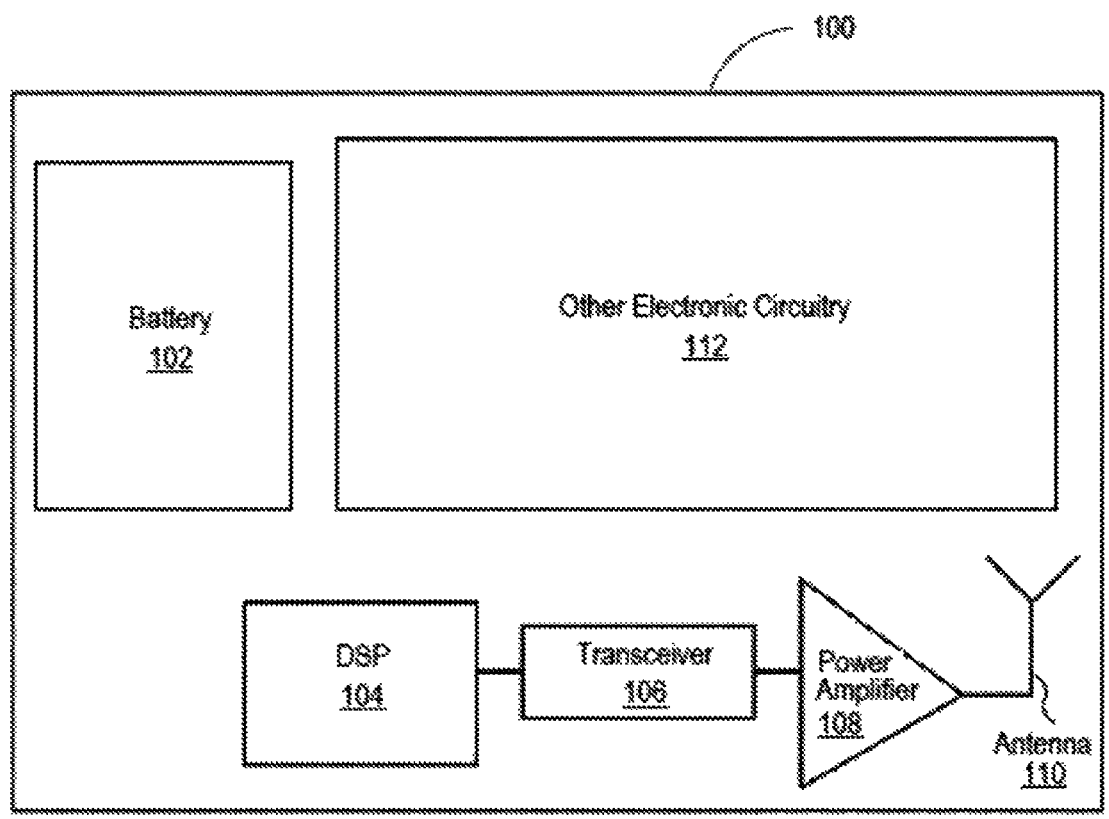
FIG. 1 illustrates a conventional wireless device.
Figure 2:
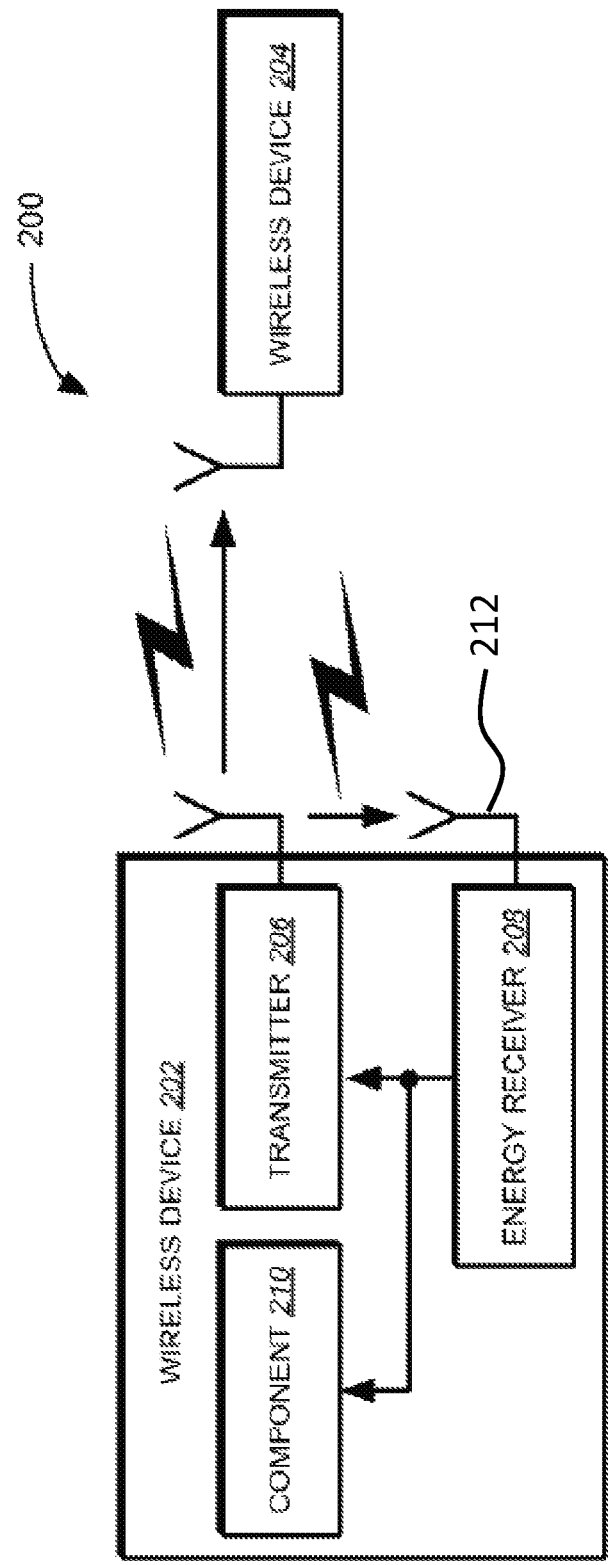
FIG. 2 depicts wireless communication device and wireless communication system.

FIG. 2 illustrates one implementation of a wireless communication system 200 according to an embodiment. The wireless communication system 200 includes wireless devices 202, 204. The wireless devices 202, 204 can be any type of device operable to transmit a signal wirelessly, such as, for example, a cellular phone, a personal digital assistant (PDA), a wireless headset, a laptop or desktop computer, a router, a key fob, and the like.

In one implementation, the wireless device 202 includes a transmitter 206, an energy receiver 208, and an energy receiver (ERX) antenna 212. The energy receiver 208 can convert a signal received by the ERX antenna 212 into power that is then provided back to, e.g., the transmitter 206 and/or another component 210 of the wireless device 202. The signal received by the ERX antenna 212 may be, for example, a portion of the signal being transmitted from transmitter 206 to the wireless device 204.

The component 210 can provide any function associated with the wireless device 202 that requires power, for example, a touch pad, a light (or backlight), a display screen, a digital signal processor, a receiver, a transmitter, a battery, and so on.

The energy receiving (ERX) antenna 212 is a frequency tunable antenna, the tuning of which can be controlled by energy receiver 208 (or a controller therein) to provide enhanced power efficiency in wireless device 202. A plurality of ERX antennas 212 may be provided for wireless device 202. In some examples, the ERX antenna(s) may be provided on an outer casing of the wireless device 202. In other examples, the ERX antenna(s) 212 may be internally provided within an outer casing of wireless device 202.

In one implementation, the signal that is converted into power is a time variant (or AC) communication signal. Although the wireless device 202 is shown as including one transmitter and one energy receiver, the wireless device 202 can include any number of transmitters and energy receivers. Likewise, the wireless device 204 can include a transmitter and an energy receiver (not specifically depicted).

In one implementation, the energy receiver 208 is further operable to convert a signal transmitted from the wireless device 204 into power for use by the wireless device 202. In such an implementation, the wireless device 202 can receive power from the energy receiver 208 even when the transmitter 206 is not active. In some examples, the energy receiving (ERX) antenna 212 can be dynamically tuned or re-tuned to provide enhanced power efficiency in wireless device 202 by changing the primary reception frequency of ERX antenna 212 to match the strongest available RF signal or to otherwise increase energy received from all presently available RF signals whether or not that requires matching to one specific RF signal or tuning to a frequency between presently available RF signals.

A tunable ERX antenna 212 permits the energy receiver 208 to use energy from sources other than one particular external wireless device 204 or the transmitter 206 in wireless device 202. For example, a full range sweep of the ERX antenna 212 frequency spectrum can be performed to detect whether there is sufficient energy to be absorbed at any given signal frequency being emitted from one or more external sources (e.g., a wireless device 204).

Additionally, the ERX antenna 212 can be tuned to adjust the reception frequency to a more optimal energy absorption setting if the initial antenna setting is not optimal or no longer considered optimal. For example, if a new or different wireless device 204 begins transmitting a stronger signal than an initially available signal, the ERX antenna 212 may be re-tuned to account for the newly available signal source.

Furthermore, in some instances, wireless device 202 may have variations in components that would cause an un-tuned ERX antenna 212 to be sub-optimal for energy absorption at some particular frequency or frequencies. Tuning of ERX antenna 212 can be used to remove such undesired effects that might otherwise result from component or manufacturing process variations.

The additional power provided by the energy receiver 208 can be used as a supplementary power source to a battery or other power source within the wireless device 202. In one implementation, the energy receiver 208, or more particularly ERX antenna(s) 212, can be tuned to a frequency of a transmitted signal to increase effectiveness of the energy receiver 208 such that the energy receiver 208 can convert a maximum amount of power available from the transmitted signal(s). Thus, the power efficiency of an electronic device (e.g., wireless device 202) can be improved by using an energy receiver (energy receiver circuitry) incorporating or connected to a tunable antenna.

In one implementation, the transmitted signal received by the ERX antenna(s) 212 is a signal that was itself transmitted by the wireless device 202. In other examples, the transmitted signal can be a signal that was transmitted from a second, external device (e.g., wireless device 204) that is physically separated from the wireless device. In one implementation, the transmitted signal is a time variant communication signal. In one implementation, the time variant communication signal is a modulated signal having a specific frequency or frequency band associated with a wireless communication standard (e.g., GSM, CDMA (code division multiple access), WCDMA (wideband code division multiple access), Bluetooth, IEEE 802.11, and the like). The transmitted signal is converted into power (e.g., by the energy receiver 208). In one implementation, the energy receiver includes an AC to DC converter to convert AC power from the transmitted signal into DC power. The power is provided to a component of the wireless device. As discussed above, the component can provide any function associated with an electronic device that requires power. Generally, the power can be used to power functions or circuits within the electronic device, for example, the additional power can be used to charge (or extend the life of) a battery within the electronic device.

Figure 3:
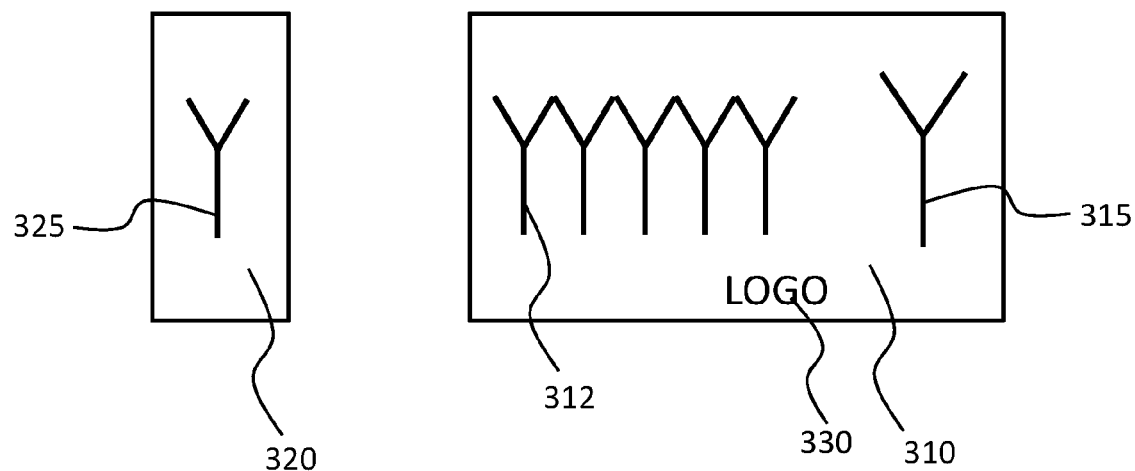
FIG. 3 depicts a wirelessly chargeable and/or wirelessly powerable electronic device and a wireless energy broadcasting device.

FIG. 3 depicts a wirelessly chargeable electronic device 310 and a wireless power broadcasting device 320. In some contexts, the wireless power broadcasting device 320 may be referred to as a wireless charger or a wireless charging device, but, in general, wireless power broadcasting device 320 may be any apparatus outputting a wireless signal (also referred to as a wireless power signal) from which energy can be harvested for powering electronic device 310 or a portion or component of electronic device 310. The electronic device 310 includes at least one ERX antenna 312 and incorporates wireless energy receiver circuitry (not specifically depicted) similar to that described above for wireless communication device 202. The ERX antenna(s) 312 can be disposed on an outer surface of the electronic device 310 or disposed internally within the electronic device 310. The electronic device 310 includes at least one RF transmit antenna 315 by which the electronic device 310 can transmit and/or receive RF signals for purposes of wireless communication (e.g., WiFi signals or the like).

In this instance, the wireless power broadcasting device 320 is specifically adapted to supply wireless signals via wireless power transmit antenna 325 for the purpose of charging a battery within electronic device 310. Though in other instances the wireless power broadcasting device 320 may be any device outputting a wireless signal for any purpose, whether or not the signal is being output with any intention of being received by or otherwise used by electronic device 310 in any manner.

In some instances, one, some subset of, or all available ERX antennas 312 may be tunable for the purposes of optimizing received energy from available RF signals. In other instances, one set of ERX antennas 312 can be set/tuned to receive a signal from RF transmit antenna 315 and another set of ERX antennas 312 can be set/tuned to receive wireless charging signals from wireless power broadcasting device 320. That is, one set of ERX antennas 312 can be tuned to one frequency and another set of ERX antennas 312 can be tuned to another frequency.

In one implementation, an ERX antenna 312 is initially tuned to the frequency of transmit antenna 315 to receive a portion of the signal from electronic device's (310) own RF transmitter when the RF transmitter is presently active. The reason for this is that unless the remote wireless power broadcasting device 320 is located relatively close, more energy will likely be absorbable from the transmitter in electronic device 310 than from the wireless power broadcasting device 320.

In another implementation, an ERX antenna 312 is initially tuned to the frequency of the remote wireless power broadcasting device 320 while no signal is being transmitted by electronic device 310. Here, the remote wireless power broadcasting device 320 is providing power that can be absorbed and electronic device 310 is providing none (i.e., no transmitter output via RF transmit antenna 315).

Figure 4:
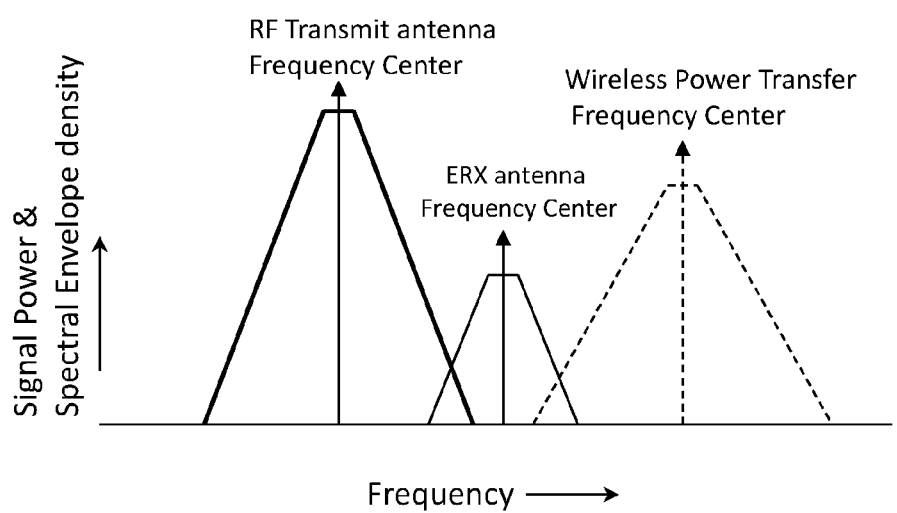
FIG. 4 illustrates an energy receiver antenna tuned to a frequency center between an RF transmission frequency center and a wireless power transfer frequency center.

In yet another implementation, an ERX antenna 312 is initially tuned to a frequency somewhere in between its own RF transmit frequency and a wireless charging frequency from wireless power broadcasting device 320. This setting can be adopted to maximize the energy absorption from all available power (transmission) sources (e.g., device 310 and device 320). FIG. 4 depicts an ERX antenna (e.g., ERX antenna 312) tuned to a frequency center between the frequency center of the signal being output via RF transmit antenna (e.g., transmit antenna 315) and the power transfer signal from a wireless charging device (e.g., wireless power broadcasting device 320).

In general, in an electronic device 310, there is an advantage in tuning one antenna or one set of antennas versus using two different antennas or set of antennas. If one antenna (or set) is specifically dedicated to absorbing the device's own transmitted RF energy and another antenna (or set) is specifically dedicated to absorbing external RF signals for wireless charging, then one set or the other of antenna may go unused when its dedicated RF source is not active.

For RF energy, receiver antenna power density is calculated in $mW/cm^2$; thus, any given wireless device might have limited physical space available for implementation of energy receiver antennas. If the available space is divided between two antennas (or two sets of antennas), then, in some instances, both antennas (or both sets) may not be able to function optimally and the space being used for the non-functional (or non-optimally functioning) antenna (or set) is at least partially wasted. However, by using one tunable antenna (or one set of tunable antennas), the electronic device can absorb and utilize the available energy from all possible sources without wasting space. This method is particularly useful when the electronic device's (310) own RF transmitter and the wireless power broadcasting device 320 have specifically allocated frequencies that allow for one antenna (or set of antennas) to be tuned to receive energy at both allocated frequencies There may also be instances in which one ERX antenna 312 (or set of ERX 312 antennas) cannot be tuned to optimally receive energy from the electronic device's (310) own RF transmitter and wireless charger device 320 simultaneously. In such cases, it may generally be better to have two ERX antennas 312 (or two sets of ERX antennas 312). That is, when two sets of ERX antennas are available, then one set can be tuned to the transmission frequency of electronic device 310, and the other set can be tuned to the signal from wireless power broadcasting device 320. For example, in some instances, the frequency spectrum locations for the RF transmitter in electronic device 310 and the signal output from wireless power broadcasting device 320 may be too distant from each other to allow the use of a single set of antennas to receive energy from both sources simultaneously.

As noted, the remote wireless power broadcasting device 320 can be a purpose-built wireless charging device or may be any device incorporating a wireless transmitter (or otherwise outputting RF signal) that is within near-enough proximity to allow for energy absorption by ERX antenna(s) 312. That is, any nearby wireless signal transmitting device, such as a cellphone, can serve as wireless power broadcasting device 320. In some instances, the wireless power broadcasting device 320 has the same general design as electronic device 310, such that two (or more) electronic devices 310 in proximity with each other can simultaneously receive wireless power signals (via their respective ERX antenna(s) 312) from each other and thus mutually wireless power each other at least partially.

In some instances, it may be desirable to provide prompting to position electronic device 310 in proximity to a potential wireless power broadcasting device 320. For example, an electronic device 310 (e.g., a cellphone) can output an audio, visual, or motion reminder to prompt a user to move the electronic device 310 closer to a nearby wireless power broadcasting device 320. Likewise, the remote wireless power broadcasting device 320 can instead or additionally display an audio, visual, motion reminder to prompt a user to move the wireless power broadcasting device 320 closer to the electronic device 310 for wireless charging and/or powering. The prompting provided from wireless power broadcasting device 320 may also or instead suggest that electronic device 310 should be positioned closer to wireless power broadcasting device 320.

The capability of an electronic device 310 to engage in mutual charging with other electronic devices 310 via normal RF transmitter operations (that is, operations not specifically related to wireless charging, such as providing typical cellphone communication services) of these devices, may cause users of these device to prefer to locate their devices in proximity with similar devices. That is, if one or more users know that his/her electronic device 310 and others' electronic devices 310 are capable of wirelessly providing power to each other then, one or more of these users can then choose to place their electronic device 310 closer together for better energy absorption. The mutual charging/powering capability of electronic devices 310 may be indicated via an externally displayed logo 330 ("LOGO") to allow users to identify other electronic devices 310 that are capable of mutual wireless powering/charging. The logo 330 may be displayed on an outer casing of the electronic device 310 and/or may be generated and displayed electronically on a display screen or the like.

In some examples, electronic device 310 may instruct the wireless power broadcasting device 320 to shift output frequency to a more optimal frequency so that the ERX antenna(s) 312 can absorb more energy. The instruction from electronic device 310 can be sent wirelessly to wireless power broadcasting device 320 using Bluetooth®, Wireless Lan, or any other inter-device communication method. For example, if the wireless power broadcasting device 320 is transmitting at 5.8 GHz or 1.9 GHz, then electronic device 310 can instruct the wireless power broadcasting device 320 to shift transmission frequency to 2.4 GHz or 900 MHz to allow for better energy absorption via ERX antenna(s) 312.

Additionally, a user can manually set the wireless power signal frequency of wireless power broadcasting device 320 to a better frequency for energy absorption, if the user knows the optimal (or better) frequency for energy absorption via ERX antenna(s) 312. Such information can be externally marked on the electronic device 310 (or wireless power broadcasting device 320) and/or can be included (or provided) digitally within the electronic device 310 (or wireless power broadcasting device 320).

One or More Signal Emitters

Figure 5:
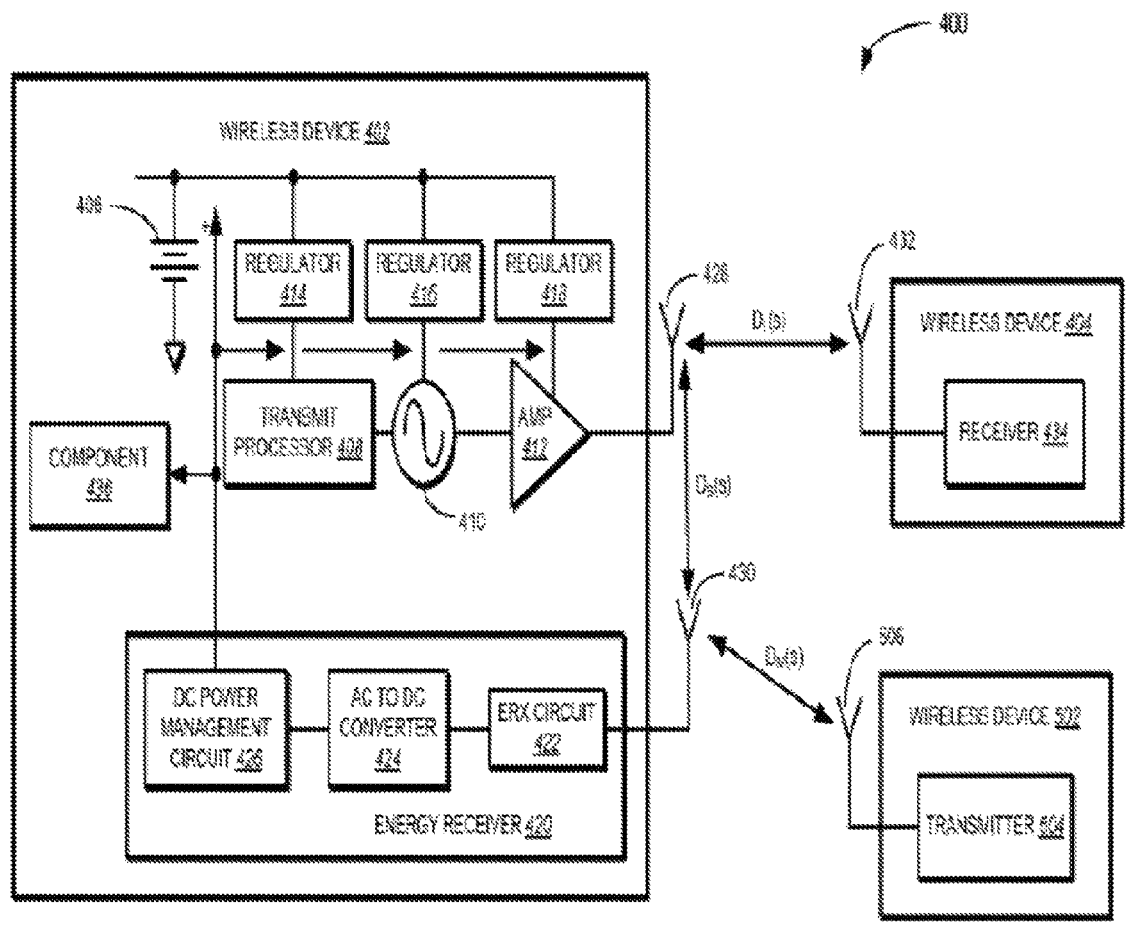
FIG. 5 illustrates an electronic device and a wireless communication system according to an embodiment.

FIG. 5 illustrates one implementation of a wireless communication system 400 including wireless devices 402, 404. In one implementation, the wireless device 402 includes a DC power source 406 that provides power to a transmit processor 408, a modulator 410, and a power amplifier 412. In one implementation, the wireless device 402 further optionally includes regulators 414, 416, 418 that respectively provide a correct voltage and/or current regulation to the transmit processor 408, the modulator 410, and the power amplifier 412. In one implementation, the DC power source 406 further provides power to a component 436 of the wireless device 402. The component 436 can be, for example, a touch pad, a light (or backlight), a display screen, a digital signal processor, a receiver, a transmitter, a battery, and so on. In one implementation, the wireless device 402 further includes an energy receiver 420 that includes an energy receiver (ERX) circuit 422 (to receive a time variant communication signal) and an AC to DC converter 424 (to convert the received communication signal into DC power). The energy receiver 420 can further include a DC power management circuit 426 that can provide proper voltage levels of DC power to circuits (or components) within the wireless devices 402.

In one implementation, a distance ($D_S(s)$) between an antenna 428 and an ERX antenna 430 (of the energy receiver 420) is much smaller relative to a distance ($D_L(s)$) between the antenna 428 and an antenna 432 (of a receiver 434 within the wireless device 404). In such an implementation, the ERX antenna 430 (and energy receiver circuit 422) can be placed physically near the antenna 428 by design. By this choice, the energy receiver 420 can receive a signal transmitted from the antenna 428 with less attenuation and/or distortion compared a signal received by the antenna 432 of the wireless device 404. Operating characteristics associated with the (transmitter) antenna 428 and signals transmitted by the antenna 428 can be known at a time of manufacture and, therefore, during manufacture, a design of the ERX antenna 430 of the energy receiver 420 can optimized to capture a maximum amount of signal transmitted through the antenna 428. The ERX antenna 430 and other components of the energy receiver 420 can be designed and placed so as to not interfere with signals to be radiated to an intended remote wireless device antenna (e.g., antenna 432 of the wireless device 404).

FIG. 5 also illustrates the wireless communication system 400 further including a wireless device 502. As shown in FIG. 5, the wireless device 502 includes a transmitter 504 and an antenna 506 that is a distance $D_M(s)$ away from the ERX antenna 430. In the implementation shown in FIG. 5, the energy receiver 420 is configured to also convert a transmitted signal from the wireless device 502 into DC power for use by the wireless device 402. The transmitted signal from the wireless device 502 can be a time variant signal associated with a same or different wireless communication standard as a signal transmitted by the wireless device 402. In the wireless communication system 400 either of wireless devices 404 and 502 may be optional in some implementations.

Tuning ERX Antenna(s)

In a particular example, ERX antenna 430 may be a tunable antenna. ERX antenna 430 may be tunable to the to a signal frequency transmitted by antenna 428 or a signal frequency transmitted by wireless device 404 or wireless device 502. The signal frequency to which ERX antenna 430 is tuned can be selected upon the basis of the detected or otherwise known frequencies being transmitted to wireless device 404 or by wireless device 502.

The signal frequency to which ERX antenna 430 is tuned may be between signal frequencies emitted by wireless devices 404, 502, and 428 (see FIG. 4) or may be tuned to match the stronger or otherwise more useful signal (from the standpoint of power conversion) incident on ERX antenna 430.

While various methods and designs are known regarding antenna frequency tuning, one demonstrated method includes the use of a microelectromechanical system (MEMS) capacitor(s) to maximize antenna reception efficiency over a range of frequencies, as disclosed in "Digital RF MEMS Capacitor Maximizes Smart-phone Antenna Efficiency," *Electronic Design*, p. 60, vol. 61, Jul. 11, 2013.

Additionally, the ERX circuit 422 (or another component in energy receiver 420 or wireless device 402) may control the ERX antenna 430 reception signal frequency by adjusting aspects of the ERX antenna 430, such as resonant frequency, performing sweep to search for an optimum frequency center from the standpoint of power conversion. One method of tuning is to set the ERX antenna 430 frequency to a minimum setting and measure absorbed power; then adjust the frequency by a preset increment and measure absorbed power again. The process can be repeated until maximum absorbed power absorbed within the possible frequency range of ERX antenna 430 is detected or determined.

Furthermore, in some instances, widening the spectrum of a given antenna (e.g., ERX antenna 430) can also allow for more energy to be absorbed by the antenna. Usually a wireless communication antenna is designed for high Q so that it can most efficiently receive and transmit a particular RF signal frequency, but this can only be achieved over narrow band of frequency spectrum. By intentionally widening the spectrum of an energy receiver (ERX) antenna, the ERX antenna might not be the most efficient possible at any particular frequency; however, the ERX antenna will be able to absorb energy from a much wider frequency spectrum.

Conversion of Unintended Signal Output(s)

Figure 6:
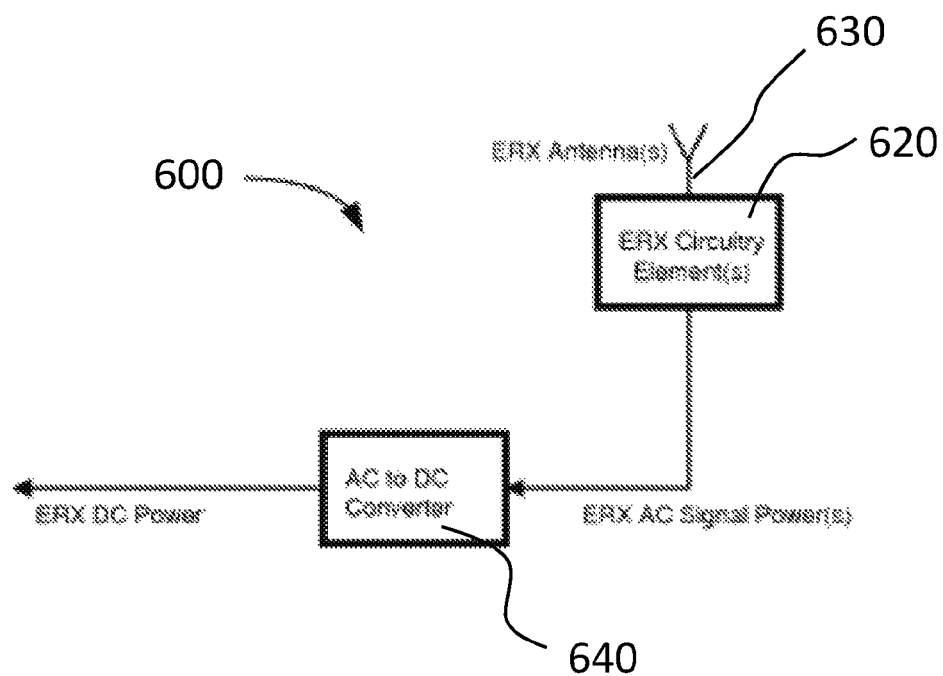
FIG. 6 illustrates an electronic device including an energy receiver antenna according to an embodiment.

FIG. 6 depicts another embodiment in which an electronic device 600 includes a radiated signal energy conversion circuitry 620 ("ERX Circuitry Element(s)"); and at least one energy receiver (ERX) antenna 630 connected to the radiated signal energy conversion circuitry 620. The circuitry 620 may include components for tuning the ERX antenna 630 to an appropriate reception frequency. The electronic device 600 can also include AC to DC conversion element(s) 640 to permit the energy received by ERX antenna 630 to be provided as direct current power.

In general, the ERX antenna 630 has a tunable reception frequency in a manner similar to ERX antenna 212, ERX antenna 312, or ERX antenna 430. However, in this instance, electronic device 600 does not specifically include a transmitter type component and a separate transmit antenna element or such component may be disabled or otherwise inactive. ERX antenna 630 can receive emitted signals (which might otherwise be considered noise) from other portions of electronic device 600 or nearby devices (not specifically depicted). For example, CPUs, LVDS (low voltage differential signaling) ICs and other components of computers and server farms can also generate and radiate switching energy that can be absorbed by ERX antenna 630 for reuse to reduce power consumption.

The concepts described in the disclosed examples can be readily applied to these types of components or systems as well. For example, a CPU clock frequency might be at 2 GHz; the energy receiver antenna(s) 630 can be tuned to 2 GHz range to capture and reuse energy emitted at this frequency by the CPU. However, in a low power mode, the CPU can be set to run at a lower clock speed. The energy receiver antenna(s) 630 can also be tuned to this lower frequency. The computer or electronic device 600 containing such a CPU could also have a separate wireless charging system that might entail the additional inclusion of the energy receiver antenna(s) (e.g., 212, 312, 430) described above.

Isolation of ERX System from Transmit System

In some situations, it may be preferable to completely electrically disconnect an energy receiver (ERX) antenna from other components of the electronic device in which it is disposed. In such cases, the ERX antenna can be completed turned off (disconnected) by adding one or more switches between the ERX antenna and other components of the electronic device. For example, usually an RF antenna is switched between RF Transmit and Receiver functions of a cellphone (and other similar devices); but the antenna remains connected to one side or the other of the transmitter or receiver. However, in the instant case, it is possible turn off all the included switches so that the ERX antenna(s) (whether deliberately weakened and/or perfectly tuned) is completely disconnected from RF to DC converter circuitry (e.g., in FIG. 5 ERX antenna 430 is electrically disconnected from energy receiver 420 and/or energy receiver 420 is electrically disconnected from component 436 and/or other portions of wireless device 402).

Figure 7:
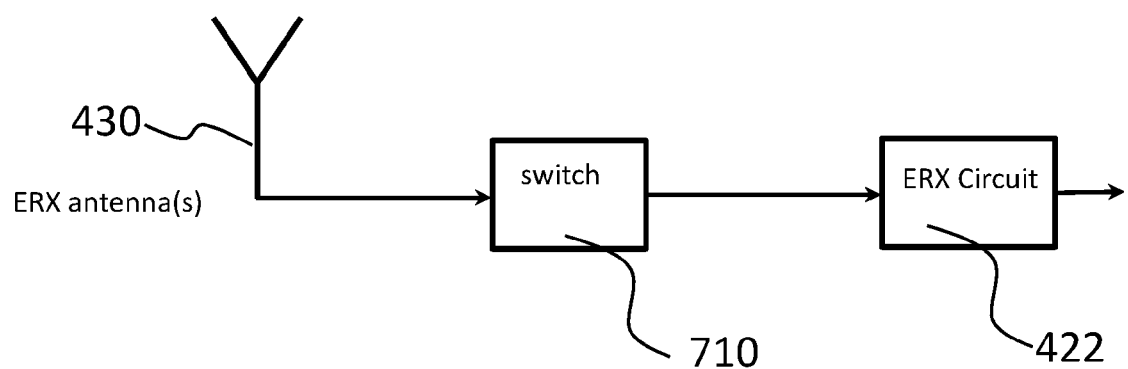
FIG. 7 illustrates aspects of electronic device including an electrically isolatable energy receiver antenna.

FIG. 7 depicts a modification of the wireless device 402 (depicted in FIG. 5) to incorporate an isolating switch 710 between the ERX antenna(s) 430 and the ERX circuit 422. The reason for this inclusion of one or more switches is that even though ERX antenna can be placed very close to the RF transmit antenna, there might be the rare event that a cellphone is located right at the edge of a cell tower coverage area. By completely disconnecting the energy receiver antenna(s) from the other components in wireless device 402, it cannot be claimed there will be even the slightest RF transmit signal degradation due to the energy receiver ERX antenna 430 and its associated circuitry (e.g., energy receiver 420). An example method for providing this switching function (e.g., isolating switch 710) is described in, "Flipping the CMOS Switch," *IEEE Microwave Magazine*, p. 86-96, February 2010 (see, e.g., p. 89, "FIG. 2. Series-shunt single-pole double-throw transmit/receive switch topology.").

EXAMPLE EMBODIMENTS

In one embodiment, an electronic device includes a transmitter generating a wireless transmission signal at an RF transmit frequency. An RF transmitter antenna for transmitting the wireless transmission signal at the RF transmit frequency is provided. Wireless charging circuitry and an energy receiver antenna connected to the wireless charging circuitry is also provided. The energy receiver antenna has a tunable reception frequency. In some examples, the electronic device may also include a controller configured to tune the tunable reception frequency of the energy receiver antenna. The controller may be configured to tune the tunable reception frequency to the RF transmit frequency when the RF transmitter antenna is actively transmitting the wireless transmission signal. The controller may be configured to tune the tunable reception frequency to a wireless charging signal frequency that is different from the RF transmit frequency when the RF transmitter antenna is not actively transmitting the wireless transmission signal. The controller may be configured to tune the tunable reception frequency to a frequency that is between the RF transmit frequency and a wireless charging signal frequency from an external wireless charging device when the RF transmitter antenna is actively transmitting the wireless transmission signal and the wireless charging signal is being received by the electronic device. In some examples, the tunable reception frequency can be set to a frequency that is between the RF transmit frequency and a wireless charging signal frequency that is expected to be transmitted from a remote wireless charger device. In some further examples, the electronic device can include a controller configured to perform a full range sweep of the energy receiver antenna frequency spectrum to detect any frequency at which energy is being received and then tune the tunable reception frequency of the energy receiver antenna to any detected frequency at which the energy being received is sufficient to generate power via the wireless charging circuitry. The electronic device may further include a switch between the energy receiver antenna and the wireless charging circuitry, wherein the energy receiver antenna is electrically disconnectable from the wireless charging circuitry (claim 1) by operation of the switch.

In another embodiment, an electronic device includes a transmitter generating a wireless transmission signal at an RF transmit frequency, an RF transmitter antenna for transmitting the wireless transmission signal at the RF transmit frequency, wireless charging circuitry, a first energy receiver antenna connected to the wireless charging circuitry and tuned to the RF transmit frequency; and a second energy receiver antenna connected to the wireless charging circuitry and tuned to, or tunable to, an wireless charging signal frequency expected from a remote device, which may be a wireless charger device.

In yet another embodiment, a method of charging or powering an electronic device comprises: tuning a reception frequency of an energy receiver antenna to correspond to a frequency of a signal received at the energy receiver antenna. The energy receiver antenna is connected to wireless charging circuitry that can convert the received signal into energy useable by a component in the electronic device. In some examples, the signal received at the energy receiver antenna is a wireless charging signal from a remote wireless charger device. In other examples, the signal received at the energy receiver is any RF signal being transmitted or generated by another device. The method may further comprise transmitting an instruction from the electronic device to a remote wireless charger device to request or cause the remote wireless charger device to shift frequency of the wireless charging signal. The signal received at the energy receiver antenna may be a wireless transmission signal from a remote wireless device. This wireless transmission signal may be within a standard communication frequency band in some examples. The method of these examples may further comprise transmitting an instruction from the electronic device to the remote wireless device to request or cause the remote wireless device to shift frequency of the wireless transmission signal. In some examples, the method can also include providing a cue on or an instruction to the electronic device to move the electronic device closer to the remote wireless charger device or the remote wireless device. In other examples, the method can also include providing a cue on or an instruction to the remote wireless charger device or the remote wireless device to move the remote wireless charger device or the remote wireless device closer to the electronic device.

In yet another embodiment, an electronic device can include radiated signal energy conversion circuitry and an energy receiver antenna connected to the radiated signal energy conversion circuitry and the energy receiver antenna has a tunable reception frequency.

The electronic device in some examples may include a switch between the energy receiver antenna and the radiated signal power conversion circuitry, wherein the energy receiver antenna is electrically disconnectable from the radiated signal energy conversion circuitry by operation of the switch.

While the foregoing is directed to embodiments of the present invention, other and further embodiments of the invention may be devised without departing from the basic scope thereof.

What is claimed is:

1. An electronic device, comprising:
   wireless power receiver circuitry;
   a first energy receiver antenna connected to the wireless energy receiver circuitry, the first energy receiver antenna having a tunable reception frequency;
   a controller configured to tune the tunable reception frequency of the first energy receiver antenna;
   a transmitter configured to generate a wireless transmission signal at a radio frequency (RF) transmit frequency; and
   a transmitter antenna for transmitting the wireless transmission signal at the RF transmit frequency, wherein
   the controller is configured to tune the tunable reception frequency of the first energy receiver antenna to the RF transmit frequency if the transmitter antenna is actively transmitting the wireless transmission signal, and
   the controller is configured to tune the tunable reception frequency of the first energy receiver antenna to a wireless energy signal frequency different from the RF transmit frequency if the transmitter antenna is not actively transmitting the wireless transmission signal.

2. The electronic device of claim 1, wherein the controller is configured to tune the tunable reception frequency of the first energy receiver antenna to a frequency that is between the RF transmit frequency and a wireless energy signal frequency if the transmitter antenna is actively transmitting the wireless transmission signal and the wireless energy signal is being received by the first energy receiver antenna.

3. The electronic device of claim 1, wherein the controller is configured to:
   perform a sweep of a receivable frequency spectrum for the first energy receiver antenna and detect any frequency in the receivable frequency spectrum at which energy is being received at a level equal to or greater than required to power the wireless energy receiver circuitry; and
   tune the tunable reception frequency of the first energy receiver antenna to receive energy at least one detected frequency in the receivable frequency spectrum.

4. The electronic device of claim 1, further comprising a plurality of energy receiver antennas connected to the wireless energy receiver circuitry.

5. The electronic device of claim 1, further comprising:
   a second energy receiver antenna connected to the wireless energy receiver circuitry and matched to the RF transmit frequency.

6. The electronic device of claim 1, further comprising:
   a second energy receiver antenna connected to the wireless energy receiver circuitry, wherein
   the second energy receiver antenna has a tunable reception frequency, and
   the controller is configured to tune the tunable reception frequency of the second energy receiver antenna independently from the tunable reception frequency of the first energy receiver antenna.

7. A wireless communication device, comprising:
   a transmitter configured to generate a wireless transmission signal at a radio frequency (RF) transmit frequency;
   a transmitter antenna connected to the transmitter for transmitting the wireless transmission signal at the RF transmit frequency;
   an energy receiver antenna having a tunable reception frequency;
   wireless energy receiver circuitry connected to the energy receiver antenna and configured to convert signals received by the energy receiver antenna into direct current power; and
   a controller configured to:
     tune the tunable reception frequency of the energy receiver antenna,
     tune the tunable reception frequency of the energy receiver antenna to the RF transmit frequency if the transmitter antenna is actively transmitting the wireless transmission signal, and
     tune the tunable reception frequency of the energy receiver antenna to a wireless energy signal frequency different from the RF transmit frequency if the transmitter antenna is not actively transmitting the wireless transmission signal.

8. The wireless communication device of claim 7, wherein the controller is configured to:
   detect respective signal strengths of a plurality of signals being received by the energy receiver antenna, and
   select the tunable reception frequency of the energy receiver antenna according to signal strength.

9. The wireless communication device of claim 7, wherein the controller is configured to:
   perform a sweep of a receivable frequency spectrum for the energy receiver antenna and detect any frequency in the receivable frequency spectrum at which energy is being received at a level equal to or greater than required to power the wireless energy receiver circuitry, and
   tune the tunable reception frequency of the energy receiver antenna to receive energy at least one detected frequency in the receivable frequency spectrum.

10. The wireless communication device of claim 7, further comprising:
    a battery connected to the wireless energy receiver circuitry to receive direct current power from the wireless charging circuitry.

11. The wireless communication device of claim 7, further comprising:
    an isolating switch between the energy receiver antenna and energy receiver circuitry.

* * * * *